Sept. 24, 1935.    W. C. DWYER ET AL    2,015,549
POTATO HARVESTER
Filed Dec. 1, 1933    6 Sheets-Sheet 4

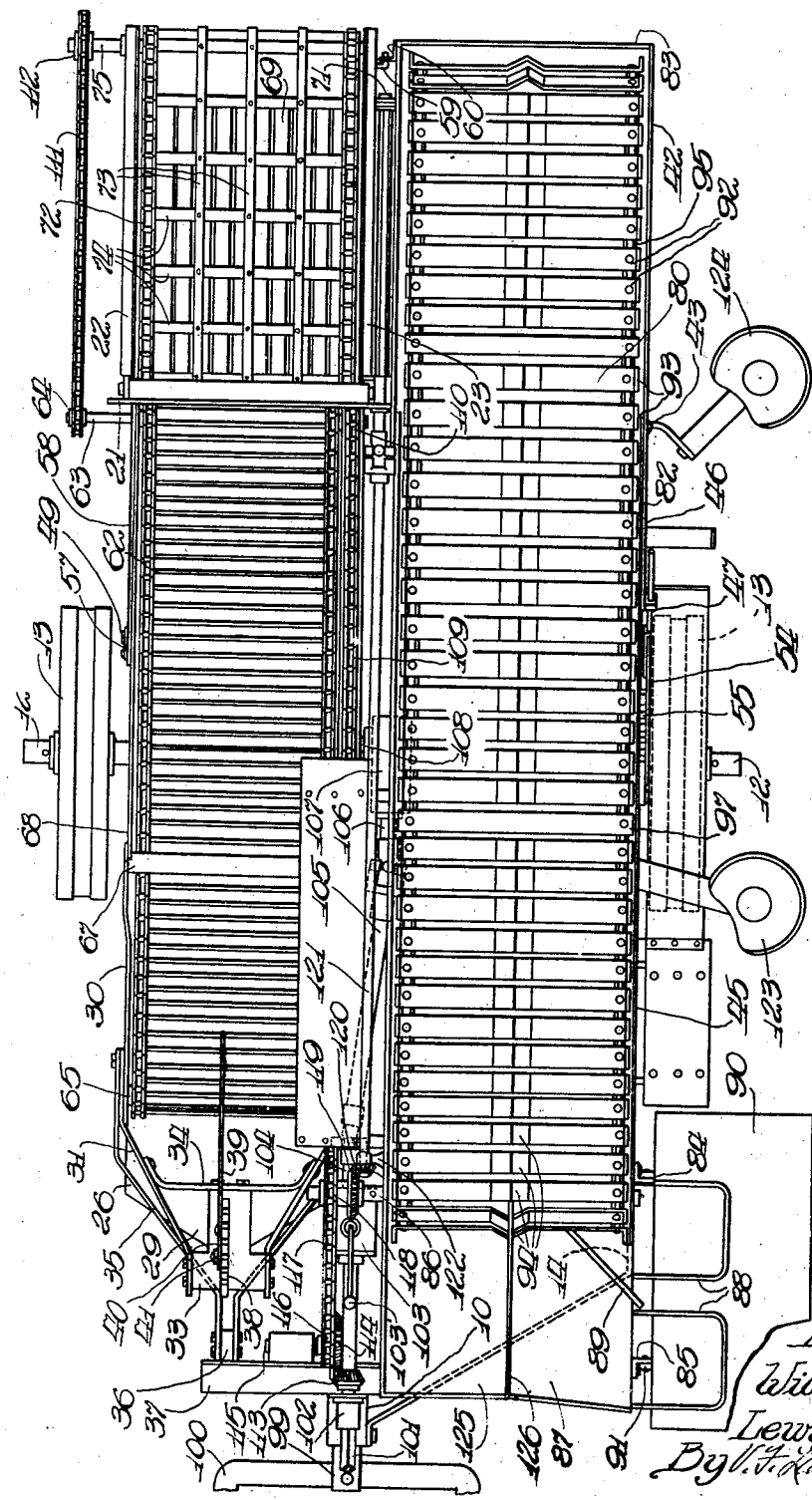

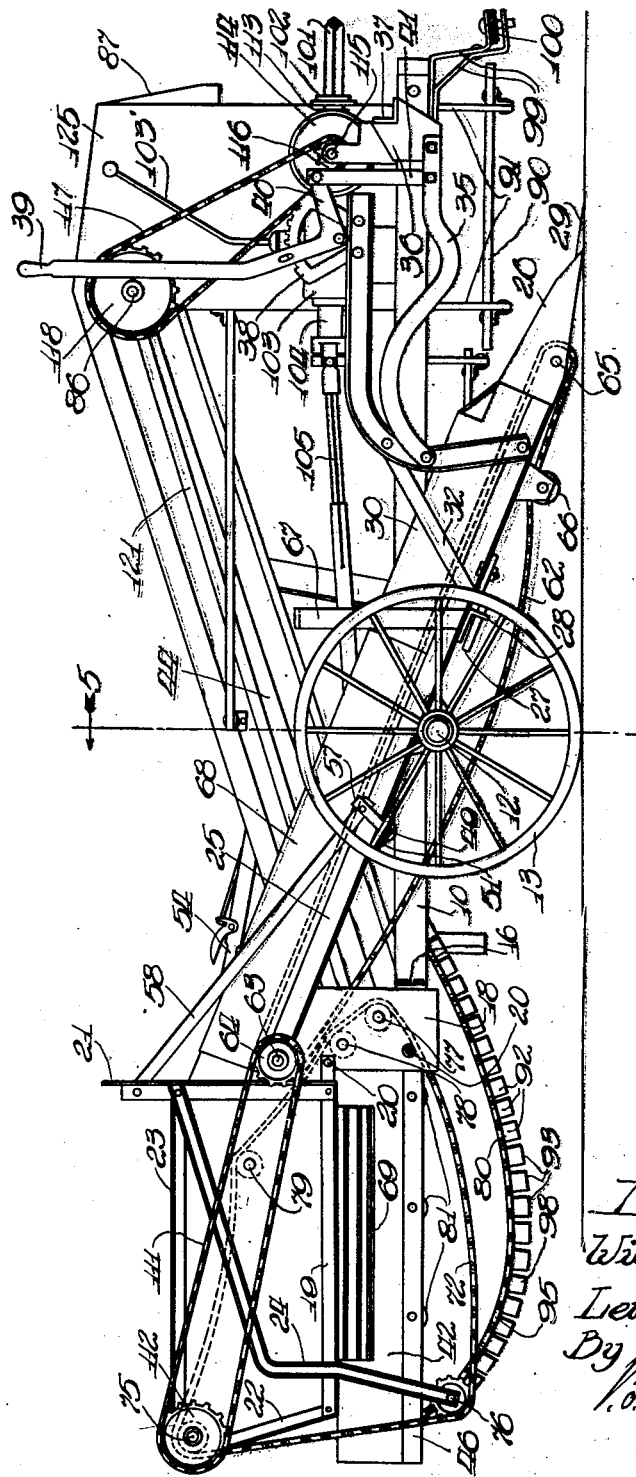

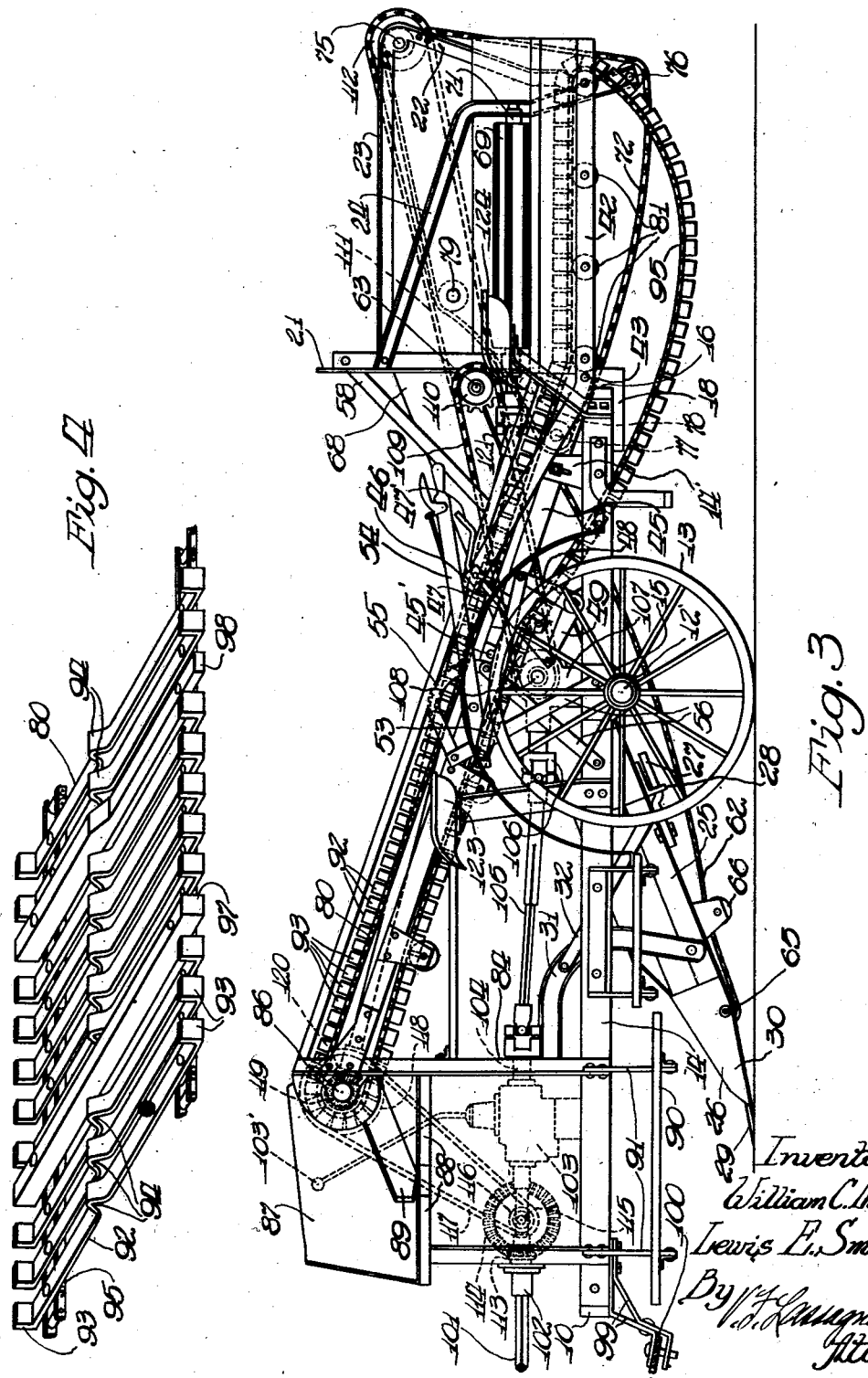

Inventors
William C. Dwyer
Lewis E. Smith
By
Atty.

Sept. 24, 1935.  W. C. DWYER ET AL  2,015,549
POTATO HARVESTER
Filed Dec. 1, 1933   6 Sheets-Sheet 5

Inventors
William C. Dwyer
Lewis E. Smith
By

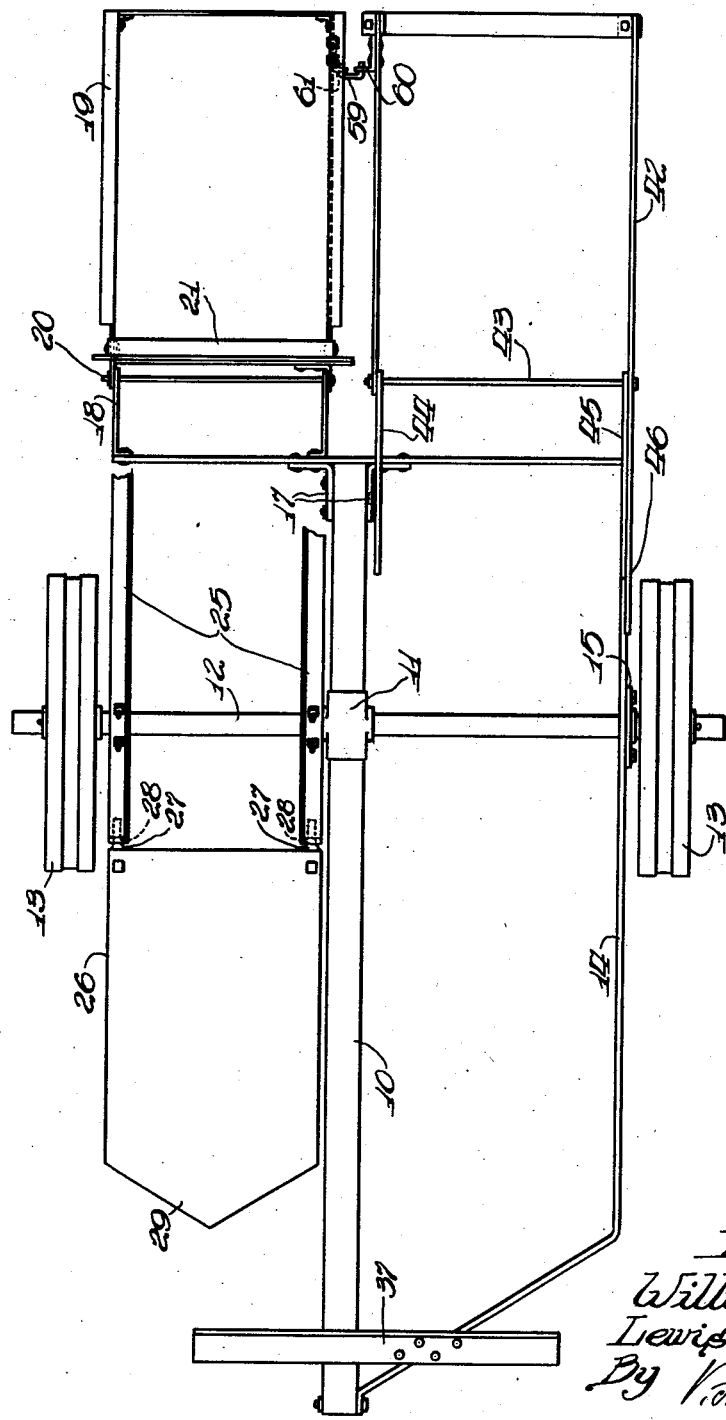

Patented Sept. 24, 1935

2,015,549

UNITED STATES PATENT OFFICE 2,015,549

POTATO HARVESTER

William C. Dwyer and Lewis E. Smith, Auburn, N. Y., assignors to International Harvester Company, a corporation of New Jersey Application December 1, 1933, Serial No. 700,520

32 Claims. (Cl. 55—135)

This invention relates to a potato harvester. More specifically it relates to a combination of units arranged in a compact machine for digging potatoes, separating dirt and rocks therefrom, and bagging or otherwise collecting the potatoes.

Mechanical potato diggers have long been used for excavating the potatoes along with the dirt and shaking the dirt from the potatoes on a conveying and shaking chain. These diggers were formerly drawn by horses, but in recent years have been drawn by tractors and have been operated from the power take-off of the tractor. In addition to separating dirt from the potatoes, which can be satisfactorily accomplished by a shaking conveyer chain of the conventional type, there is the problem of removing the vines, weeds and similar material from the potatoes and also of removing rocks and clods. In some potato growing sections, the rocks are almost as numerous as the potatoes and are frequently of substantially the same size and shape. The stones must not only be separated from the potatoes, but should be removed without permitting the potatoes to be bruised during conveying operations. This problem has been one of the major ones in the mechanical harvesting of potatoes.

The machine of the present invention was designed as a potato harvester similar in a sense to the so-called combine used for small grain. It was intended that the machine would dig and prepare for bagging, all during the movement of the machine across the field as drawn by a tractor. With this object in view, and other objects which will become apparent from the detailed decription of the machine which follows, the potato harvester embodying the invention as illustrated in the drawings was developed.

In the drawings:

Figure 1 is a plan view of a machine incorporating the features of the invention;

Figure 2 is a side elevation of the machine shown in Figure 1;

Figure 3 is a side elevation of the other side of the machine shown in Figure 1;

Figure 4 is a perspective of a section of the elevating and stone separating conveyer;

Figure 5:
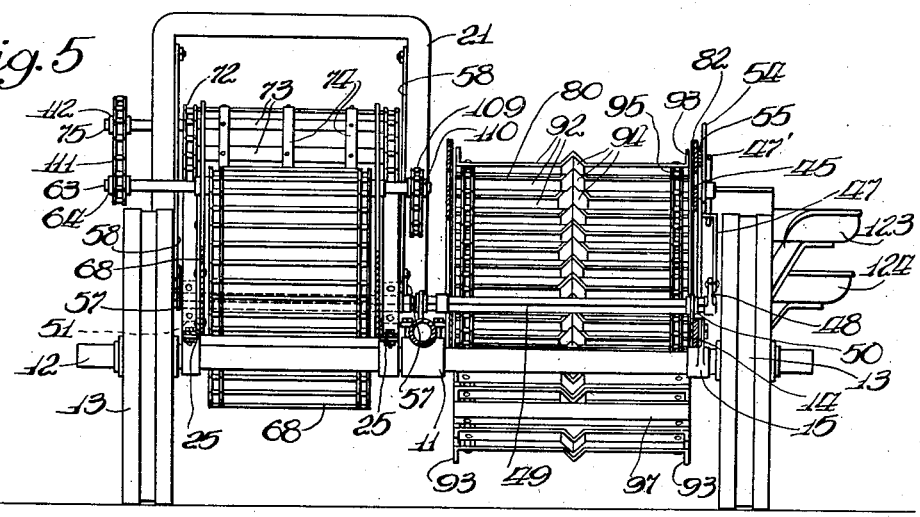
Figure 5 is a rear, transverse section taken substantially on the line 5—5 of Figure 2.
Figure 6:
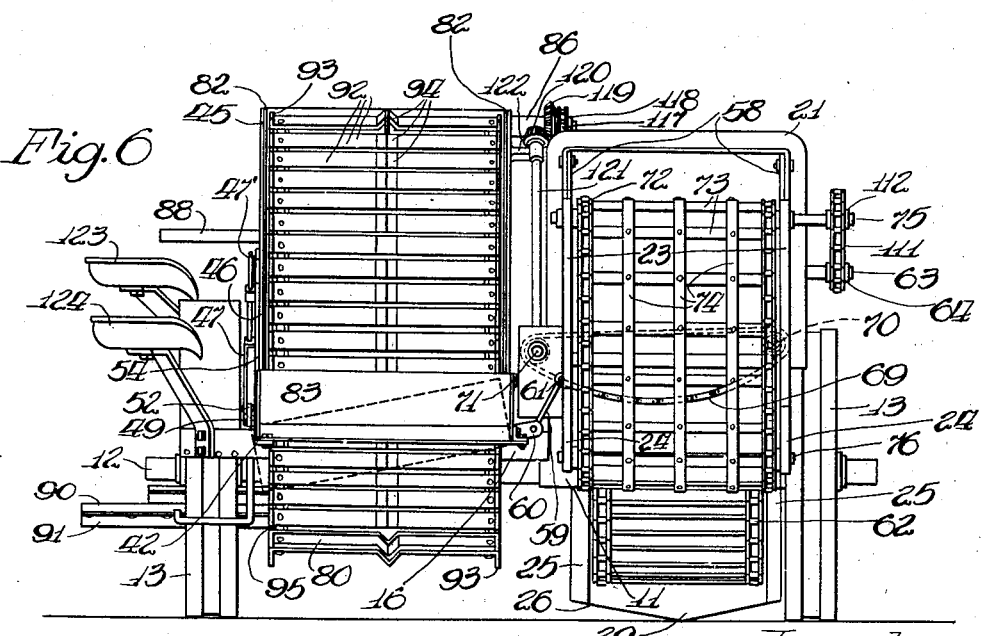
Figure 7:
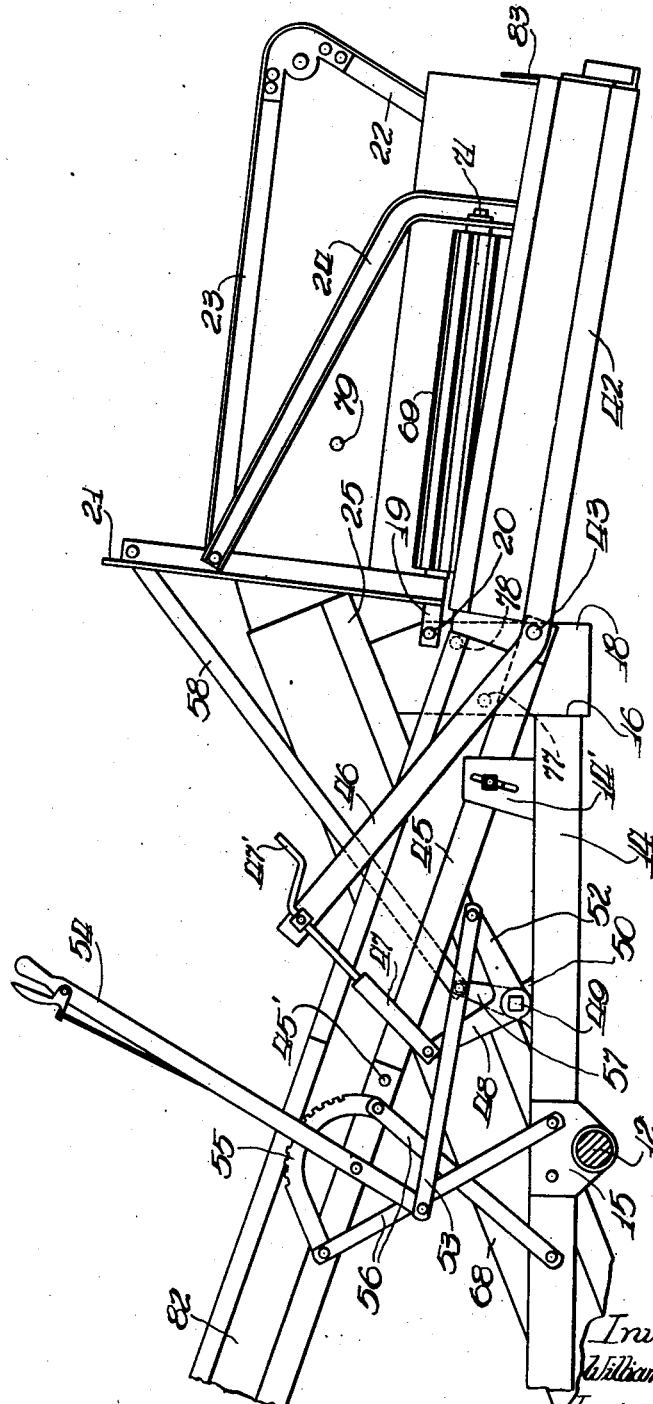

Figure 6 in an elevation from the rear of the machine; and,

Figure 7 is an enlarged view of the rear end of the machine, showing particularly the adjusting means for the rear transverse conveyer and for the lower end of the stone separating and elevating conveyor.

Figure 8 shows certain essential parts of the frame structure.

Without referring by number to the parts and elements involved, a brief description of the units making up the machine will be given, to show the general arrangement of parts and their cooperation with each other. The potato harvester comprises a main wheel supported frame which is connected to the drawbar of a tractor. On this main frame, all parts of which are rigid with respect to each other, the various mechanisms are mounted. At one side a longitudinally extending shaking and conveying chain is mounted on the frame with its lower end extending back of the digging plow, which is adjustably pivoted at ground engaging depth on a portion of the main frame. At the upper end of the conveying and shaking chain, a transverse conveyer is pivotally mounted on a transverse axis for receiving material from the conveying and shaking chain. Parallel to said shaking chain and extending from the rear upwardly toward the front of the machine, a stone separating and conveying chain is mounted with its main forward portion on the frame structure and its lower rear end carried on a support adjustable about a transverse axis. Said support is connected to the transverse conveyer support for pivoting movement therewith. In addition, means are provided for angling the lower end of the stone supporting chain supported about a longitudinal axis, to provide for better separation of the stones and potatoes. A specially designed conveyer having a high degree of efficiency separates the stones and potatoes delivered thereto by the transverse conveyor. Containers are provided at the upper end of the stone separating conveyer for receiving the potatoes and stones. The mechanisms of the harvester are driven by connections with a power take-off drive driven from the tractor.

In the drawings, Figure 8 shows certain essential parts of the frame structure on which the various units of the potato harvester are rigidly mounted or pivoted. This figure is similar to a top plan view, but shows only certain important elements of the frame structure; the others may be moved or broken away. As the details of construction of the main frame and of the frame structure supported thereon are not a part of the present invention, a showing, as in Figure 8, has been made. This showing gives the general construction and only such members and elements, both in this figure and in the other figures of the frame structure, will be referred to by number as are necessary to adequately describe the essential elements of the invention and the associated parts and driving mechanism.

As a base for the main frame, a large diameter pipe 10 is connected by a casting 11 to a transverse axle 12. Wheels 13 are mounted at the ends of the axle 12. A side frame member 14 connected at its forward end to the pipe 10 extends angularly to one side and longitudinally along the inside of one of the wheels 13 and a substantial distance to the rear of said wheel. Said frame member is secured to the axle 12 by a bracket 15. A rear transverse frame member 16, which may be a continuation of the frame member 14 or rigidly secured thereto, extends across the rear end of the pipe 10 to a point adjacent the wheel at that side of the digger. Said frame member is connected to the pipe 10 by brackets 17. Two upstanding members 18, secured to the transverse frame member 16, form a support for a frame structure 19 pivoted on a rod 20 extending through openings formed in the members 18 and through aligned openings formed in brackets secured to the frame structure 19.

Referring to Figures 2 and 3, the frame structure 19 includes at its forward end an arched angle bar 21 extending vertically upwardly at each side of the frame structure and across the top. Said frame structure also includes upwardly and rearwardly extending angle bars 22 at the rear end and horizontally extending angle bars 23 connecting the arch 21 and the bars 22. A pair of channel shaped bars 24 extend downwardly below the frame structure 19 to form a support for a purpose to be hereinafter described.

At the right side of the main frame structure, looking in a forward direction, a digging unit is supported on the main frame structure comprising an upper and lower section. The angle bars 25 rigidly secured to the axle and forming a part of the frame structure comprise the upper section of the digger unit and form a support for the lower section 26 of the digging unit. Said lower section is pivotally mounted on the frame structure by means of the lugs 27 which fit loosely in openings formed in brackets 28 mounted on the angle bars 25.

The lower section 26 of the digging unit is provided in addition to a frame structure with a digging plow 29 and side shields 30. To form means for applying draft to the digger plow and to support it in position, beams 31 connected respectively at the sides of the digger frame and braced in position by bars 32 extend forwardly and together centrally over the digger plow where they are secured to a member 33. Said member is also rigidly secured to the beams 31 by a transverse bar 34. Draft links 35 are pivotally connected to the beams 31 and to a bracket 36 rigidly secured to a transverse angle bar 37. Said angle bar is secured to the pipe 10 and the side frame member 14 in the position best shown in Figure 8. To adjust the digging depth of the plow 29, a sector 38 is rigidly secured to the member 33. A lifting lever 39 pivoted on the sector and provided with a latch for engaging the sector has an extension arm 40 connected by a link 41 with the draft link 35. This structure provides one means for adjusting the digging depth of the plow 29.

At the left hand side of the machine, looking in the forward direction, a frame structure 42 is provided for supporting a portion of the separating mechanism to be hereinafter described. Said frame structure is pivoted on the rod 43 onto the rear end of the frame structure. The frame members 44 and 45, on which the frame structure 42 is supported and which are indicated as broken off in Figure 8, extend upwardly and form a part of the main frame structure. The other frame member 45 is formed in two sections provided with a pivoted connection 45', as shown in Figure 7. Below said pivot axis the frame member is adjustably clamped to a bracket 14' secured to the side frame member 14. One side member of the frame structure 42 adjacent the wheel at that side has a forward extension 46, which provides a means for tilting the frame structure about its transverse axis. As best shown in the enlarged view of Figure 7, the extension 46 is connected by a manually adjustable link 47 with one crank 48 of a transverse rockshaft 49. Said rockshaft extends entirely across the machine, being mounted at the left side on a bracket 50, as shown in Figure 7, and at the right side on a bracket 51 secured to one of the frame members 25, as best shown in Figure 2. Another crank 52 on the rockshaft at the left hand side of the machine is connected by a link 53 with a hand lever 54 pivotally mounted on the main frame structure. A sector 55, also mounted on the frame structure, provides means for holding the hand lever by means of a latch in a plurality of adjusted positions. It will be noted that brace bars 56 crossed intermediate their ends extend from the member 45 to the side frame member 14. Throughout the frame structure, various braces of this type have been utilized. Only certain of these have been referred to and identified by number. At the right side of the machine, the rockshaft 49 carries two lever arms 57 which are connected by links 58 with the top of the arch 21. It will be understood that by this construction the frame structure 19 may be tilted about its transverse axis of attachment on the main frame structure by adjusting the lever 54.

As previously set forth, the left side of the rear frame structure 42 is connected by means of the extension 46 within the tilting mechanism. At the right side of said frame structure it is connected by a link 59 secured to a bracket 60 on the frame structure 42 to the frame structure 19 by means of a bracket 61 secured thereto.

The angle bars 25 form the base of a frame for a shaker conveyer chain 62. Said chain extends over a support at the upper end carried on the shaft 63. At the lower end the chain is carried by a support mounted on a freely rotating shaft 65. An idler roller 66 is shown to support the underneath side of the shaker chain 62. Other supports and eccentric idlers for causing agitation of the conveyor chain may be utilized, as is common practice with potato diggers of this type.

An arched member 67 assists in bracing the frame structure at the point where the lower section 26 of the digger unit is supported. Side shields 68 of the upper section of the digging unit, overlapping the side members 30 of the lower section 26 of the digger unit, are also mounted on the frame structure alongside the shaker chain 62.

In the operation of the digger, potatoes, dirt, vines, weeds and other foreign material excavated by the plow 29 are carried by the shaker chain 62 upwardly. The major portion of the dirt is removed from the potatoes during this conveying and shaking operation. The lower section 26 of the digger unit, being pivoted on the frame structure and adjustably supported, may be operated at a variable depth determined by the setting of the lever 39. At the upper end of the shaker chain 62 the potatoes and certain of the vines and weeds carried therewith, together with stones and clods, are delivered over the end of the shaker chain onto a cross-conveyer 69. Said conveyer is supported on rotatable supporting members 70 and 71 mounted adjacent the sides of the frame structure 19. The position of the conveyer 69 can best be seen in Figure 6. Said conveyer functions merely to receive material from the shaking chain and to deliver the material transversely across the machine.

To provide for removing vines and weeds from the potatoes, a specially constructed belt 72 is mounted around the conveyer 69 in such a manner as to pass between said conveyer and the end of the shaking chain, whereby all material except vines and weeds is discharged through said belt. The belt 72 is formed of cross-members 73 and webs 74 extending in the direction of the belt. The openings formed by this cross work are large enough to permit potatoes and stones to drop therethrough. However, most of the vines and weeds are retained and carried over to be discharged onto the ground. The belt 72 is mounted on a support carried by a shaft 75, a support carried by a shaft 76, an idler carried by the shaft 77, a support carried by the shaft 78, and an idler carried by the shaft 79. These supports are of a conventional construction carrying sprocket wheels which engage conventional link chains forming a part of the belt 72.

Potatoes and stones from the transverse conveyer 69 are discharged onto the separating conveyer 80. Said conveyer extends substantially the entire length of the machine along the left side. The lower rear end of the conveyer is carried on a plurality of supports 81, as shown in Figure 3. These supports are journaled on the frame structure 42 previously described. Side shield members 82 are provided along the side of the separating conveyer to prevent the discharge of material therefrom. A similar shield member 83 is also provided at the rear end secured to the frame structure 42. The transverse conveyer 69 extends centrally a sufficient distance to assure discharge of all material carried thereby onto the separating conveyer 80.

The frame members 44 and 45 previously referred to extend upwardly where they are secured to other portions of the frame structure including the upright angle bars 84 and 85. Said bars form a part of a support for a bagging device and platform. The separating conveyer 80 extends upwardly and is supported at its upper end on a rotatable support carried on the shaft 86. Suitable guides and idling roller supports are also provided for said conveyer. At its upper end the separating conveyer 80 discharges onto a slanting table 87. As best shown in Figure 1, this table slants to the outer side of the machine, at which location the sack holders 88 are provided at spaced locations. A baffle plate 89, which is pivoted to be oscillated across the table 88, provides means for diverting the potatoes into the bags held by either of the sack holders 88. A platform 90 is supported on brackets 91 secured to the main frame for supporting the bags of potatoes and the operators.

The separating conveyer 80 is specially constructed to separate stones from the potatoes and comprises one of the essential elements of the present invention. Closely spaced flat metal slats 92 have upturned ends 93 to prevent the stones and potatoes from rolling over against the side shields along the conveyer. The slats 92 are also formed approximately along the center with an upstanding ridge 94. The flat slats are secured in closely spaced relationship to chains 95, which form a conveyer belt of the slats and also provide means for driving the conveyer by means of sprockets. At intervals along the conveyer, wood slats 97 of a substantial height are positioned to prevent the rolling of stones and potatoes down the conveyer. On the stone side of the conveyer, additional stop means are provided by wood slats or bars at 98, which extend across the conveyer to the ridged center portion. The above description refers to the main frame structure, the auxiliary frame structures and the conveyers mounted thereon, and also to the means for adjusting the angular position of certain of the conveyers.

In operating a potato harvester as above described from a tractor, bars 99 secured to the front end of the main frame are spaced vertically apart to form a clevis by which the harvester is secured to the drawbar 100 of a tractor. To operate the mechanisms on the digger, power is obtained from the power take-off of the tractor, which by suitable connections is delivered to a power shaft 101. Said shaft is rotatably supported on the frame structure of the harvester by a supporting bearing 102. The shaft is continued through said bearing and extends into a variable speed transmission casing 103. Said casing is rigidly mounted on the frame structure. A shift lever 103' provides means for engaging different speeds of the transmission which consist preferably of three speeds forward and one speed reverse. A driven shaft 104 extending rearwardly from the transmission is connected by a universal joint with a splined shaft 105. Said shaft is connected by a universal joint with a shaft 106 extending into a casing 107. This casing contains bevel gears whereby power may be delivered to a transversely extending shaft 108. From a sprocket on said shaft power is transmitted by a drive chain 109 to a sprocket 110 mounted on the shaft 63, which carries the support and also driving means for the shaker conveyer chain 62. At the outside end of the shaft 63 the sprocket 64 previously referred to drives, through a chain 111, a sprocket 112 mounted on the shaft 75, which supports and forms driving means for the vine separating belt.

Forwardly of the transmission 103, a bevel gear 113 is mounted on the shaft 101. Said gear drives a bevel gear 114 mounted on a transverse shaft 115 supported on the frame structure. A sprocket 116 carried with the gear 114 drives through a chain 117 a sprocket 118 mounted on the shaft 86 previously referred to, which supports the upper end of the separating conveyer and carries means for driving said conveyer. At the inner end of the shaft 86 adjacent the sprocket 118, a bevel gear 119 is carried for rotation with the shaft. Said gear meshes with a gear 120 carried by a rearwardly and downwardly extending shaft 121. Said shaft is supported at its upper end by a bracket 122 mounted on the frame structure. At its lower end, said shaft is connected by a universal joint to the shaft 71 previously referred to, which carries the support for the inside end of the transverse conveyer 69.

The operation of the potato harvester as above described has been explained in connection with the description of its parts. Operated behind a tractor, the front end of the main frame is supported on the drawbar of the tractor at a substantially uniform height. The lever 39 is adjusted to give the desired depth of penetration to the digger plow 29. By pivoting the lower section 26 of the digger unit, as disclosed, the upper section of the digger unit forming a support for the shaking conveyer may be constructed as a part of the main frame of the harvester, only the lower section which comprises the digging shoe and a support for the lower end of the conveyer being angled during adjusting movements. The potatoes, stones, vines and other material are delivered upwardly, the dirt being shaken from the potatoes during the conveying operation. The change speed transmission forms means for altering the shaking rate or agitation of the potatoes without altering the speed of the cross conveyer and the separating conveyer. This is an important part of the present invention. The drive for the separating conveyer and the transverse conveyer is connected, as best shown in Figures 2 and 3, ahead of the transmission, whereby said conveyers operate at all times at a uniform speed, as the power take-off shafts of all modern tractors operate at uniform governed speed, regardless of the speed of the tractor. However, the change speed transmission permits variation in the speed of the shaking conveyer, as this is very desirable to minimize the effect of bruising. The conveyer has sufficient capacity to elevate more material than is ever delivered to it. Its shaking rate is made variable so as to subject the potatoes to the minimum agitation consistent with the removal of a satisfactory amount of the dirt. Particularly in stony conditions, it is desirable to maintain the agitation at a minimum rate, as the shaking of the potatoes against the stones produces very serious bruising.

At the top of the shaking conveyer chain, the stones, potatoes and vines are delivered over onto the transverse conveyer. The major portion of the vines are retained on the vine belt 72. The potatoes which are attached to the vines in some cases shake off onto the transverse conveyer. As the vine belt moves rearwardly in the direction indicated by the arrow in Figure 2, the vines are delivered over onto the ground behind the machine.

The transverse conveyer 69 delivers the stones and potatoes onto the separating conveyer 80 at its lower end. It is in the operation of this part of the machine that the major portion of the invention resides.

A previously explained, the rockshaft 49 may be rotated by the lever 54 to simultaneously lower the frame structure 19 which carries the cross-conveyer and the frame structure 42 which supports the lower end of the separating conveyer. Reference was also made to the adjustable link 47. This link, as illustrated, is formed of two sections screw-threaded together, a handle 47' being formed on one section to alter the length of the link. By altering the length of the link 47, the outside edge of the separating conveyer may be lowered without lowering the inside edge, which is supported on the transverse conveyer frame structure by the link 59. In the dotted position in Figure 6, the maximum angular position of the lower end of the separating conveyer has been shown. The frame structure 42 is constructed of light material and the joints are loosely connected to permit angling or warping of this frame structure in a diagonal direction. The separating conveyer 80 is of sufficient flexibility to operate satisfactorily with the lower end twisted or warped to the extent shown. As the potatoes and stones are delivered onto the transverse conveyer 69, the downward tilt of this conveyer about its transverse axis determines to an appreciable extent the amount of rolling of the stones and potatoes. The stones are generally flat on one side or another and do not roll as easily as the potatoes. It is, therefore, obvious that, with a small angle of tilt, the stones when discharged onto the conveyer either stick or roll over once or twice and come to a stop, while the potatoes may roll completely across the conveyer to the other side. This, in a sense, begins the separation of the stones from the potatoes and is one feature making up that phase of the invention. As the stones and potatoes in the position described are delivered from the transverse conveyer onto the lower end of the separating conveyer, the same rolling effect is brought about. The separating conveyer in normal operation slants downwardly to the rear as well as downwardly toward the outer side, the amount of tilt in both directions being controllable at the will of the operator by adjusting the lever 54 and the link 47. Again, the stones being flat, lie on the conveyer or slide over toward the ridges 94 formed on the conveyer slats, while the potatoes, being round and more resilient, roll and bounce over the ridges onto the outer side of the separating conveyer. As the conveyer moves upwardly, stones and potatoes lodge, respectively, on the cross-slats 97 at their sides of the conveyer.

Due to the roundness of some of the stones and to other conditions, it is not possible by the construction described to obtain 100 per cent. separation. Moreover, there are other foreign materials and also diseased potatoes which must be removed from the potato side of the conveyer. Operators stationed on seats 123 and 124 sort the potatoes and complete the separation of stones and clods therefrom. The potatoes are discharged onto the table 87 previously described, from which they are bagged by operators standing on the platform 90. The stones are discharged into a compartment 125 formed on the frame structure at the upper end of the separating conveyer. The particular construction of this compartment has not been shown. It may be provided with a trap door, as is old in the potato digging art, to dump the stones at intervals in piles, whereupon they may be removed from the field. A separating element 126 is placed along the table 87 in line with the ridges on the separating conveyer.

While applicants have shown and described only a preferred embodiment of their improvements in a potato harvester, it is to be understood that they contemplate as their invention all modifications thereof falling within the scope of the appended claims.

What is claimed is:

1. In a potato digger having a wheel supported main frame and in combination, a digger unit mounted on said frame, a shaking conveyer extending upwardly from said digger unit, a stone and potato separating conveyer mounted on said main frame, means for driving said conveyers, and means for operating the separating conveyer independently of the shaking conveyer whereby an excess of material may be removed from the separating conveyer without adding more material thereto from the shaking conveyer.

2. In a potato digger having a wheel supported main frame, a digger unit mounted on said frame, a shaking conveyer extending upwardly from said digger unit, a stone and potato separating conveyer mounted on said frame, means for driving the shaking conveyer, and means for independently operating the separating conveyer whereby an excess of material may be removed from the separating conveyer without adding more material thereto from the shaking conveyer.

3. In a potato digger having a wheel supported main frame and in combination, a digging unit mounted on said frame, a shaking conveyer mounted on the main frame, a stone and potato separating conveyer mounted on the main frame, means for delivering material from the shaking conveyer to the separating conveyer, power operated means for driving said conveyers, and a change speed transmission interposed in said means between the source of power and the shaking conveyer whereby the shaking conveyer may be driven at a rate of speed variable with respect to the rate of speed of the separating conveyer.

4. In a potato digger having a wheel supported main frame and in combination, digging means mounted on said frame, an elevating conveyer extending upwardly from the digging means, a stone and potato separating conveyer mounted on the main frame, power operated means for driving said conveyers, and a change speed transmission interposed in said means between the source of power and the elevating conveyer whereby said conveyer may be operated independently of the separating conveyer.

5. In a potato harvesting machine and in combination therewith, a supporting structure, an upwardly extending conveyer mounted thereon, means to deliver potatoes and rocks to be separated therefrom to the lower end of said conveyer said conveyer being provided with a higher section along its center whereby potatoes and rocks are separated mechanically, the rocks lying on the side next to the delivering means and the potatoes on the other side of the higher section away from the rocks, and means for angling the lower end of the conveyer about an axis substantially perpendicular to the direction of movement of the conveyer.

6. In a potato harvesting machine and in combination therewith, a supporting structure, an upwardly extending conveyer mounted thereon, said conveyer being provided with a higher section along its center, means for angling the lower end of the conveyer about a substantially horizontal longitudinal axis parallel to the direction of movement of the conveyer, and means to deliver potatoes and rocks to be separated therefrom to the lower end of said conveyer.

7. In a potato harvesting machine and in combination therewith, a supporting structure, an upwardly extending conveyer mounted thereon, said conveyer being provided with a higher section along its center, means for angling the lower end of the conveyer about a transverse axis substantially perpendicular to the direction of movement of the conveyer, means to deliver potatoes and rocks to be separated therefrom to the lower end of said conveyer at one side thereof, and means for angling the lower end of the conveyer about an axis substantially parallel to the direction of movement of the conveyer with the lower edge away from the receiving side of the conveyer.

8. In a potato harvesting machine, a conveyer for handling stones and potatoes as received from a digging operation, a separating conveyer arranged at right angles to said conveyer and positioned to receive material discharged therefrom, said separating conveyer extending angularly upwardly, and means on the separating conveyer preventing the rolling of stones there-across and permitting the rolling of potatoes there-across whereby a separation is obtained between the potatoes and stones.

9. In a potato harvesting machine, a conveyer for handling stones and potatoes as received from a digging operation, a separating conveyer arranged at right angles to said conveyer and positioned to receive material discharged therefrom, said separating conveyer extending angularly upwardly, and raised portions along the center on the separating conveyer preventing the rolling of stones there-across and permitting the rolling of potatoes there-across whereby a separation is obtained between the potatoes and stones.

10. In a potato harvesting machine, a conveyer for handling stones and potatoes as received from a digging operation, a separating conveyer arranged at right angles to said conveyer and positioned to receive material discharged therefrom, said separating conveyer extending angularly upwardly, and means on the separating conveyer preventing the rolling of stones there-across and to permit the rolling of potatoes there-across whereby a separation is obtained between the potatoes and stones, the lower end of the separating conveyer being provided with means for being tilted angularly downwardly away from the location at which material is received from the first named conveyer.

11. In a potato handling machine, a normally substantially horizontal conveyer, means for delivering potatoes and stones to be separated therefrom on said conveyer, a second conveyer being provided with a higher section along its center positioned to receive material from the first named conveyer, means for angling said second conveyer about a substantially horizontal axis, and additional means for tipping the side of the conveyer downwardly away from the delivery point of the potatoes to be handled for separating the same from the stones.

12. In a potato handling machine, a normally substantially horizontal conveyer, means for delivering potatoes and stones to be separated therefrom on said conveyer, a second conveyer being provided with a higher section along its center positioned to receive material from the first named conveyer, and adjustable means for tipping the side of the conveyer downwardly away from the delivery point of the potatoes to be handled separating the same from the stones.

13. In a potato harvesting machine being provided with a main frame and an upwardly extending conveyer mounted thereon and in combination therewith, a transverse conveyer mounted on said frame for operation in a direction substantially at right angles to the direction of the first named conveyer and positioned to receive material from said first named conveyer, an inclined stone separating conveyer mounted to receive material from said first transverse conveyer, means for angling said stone separating conveyer about an axis transverse to the direction of extension thereof, and means for angling the lower end of said conveyer about an axis substantially parallel to the direction of run of the conveyer.

14. In a potato harvesting machine being provided with a main frame and an upwardly extending conveyer mounted thereon and in combination therewith, a transverse conveyer mounted on said frame for operation in a direction substantially at right angles to the direction of the first named conveyer and positioned to receive material from said first named conveyer, an inclined stone separating conveyer mounted to receive material from said first transverse conveyer, and means for angling the lower end of said stone separating conveyer about an axis substantially parallel to the direction of run of the conveyer.

15. In a potato harvesting machine being provided with a main frame and an upwardly extending conveyer mounted thereon and in combination therewith, a supporting frame structure pivoted on said main frame on an axis transverse to the direction of extension of the conveyer, means for adjusting the angular position of said supporting frame about said transverse axis, a transverse conveyer mounted on said frame for operation in a direction substantially at right angles to the direction of the first named conveyer and positioned to receive material from said first named conveyer, an inclined stone separating conveyer mounted to receive material from said first transverse conveyer, means for angling said stone separating conveyer about an axis transverse to the direction of extension thereof, and means for angling the lower end of said conveyer about an axis substantially parallel to the direction of run of the conveyer.

16. In a potato digger having a wheel supported main frame, a digger unit mounted on said frame, an upwardly extending conveyer positioned to receive material from said digger unit, and in combination therewith, a supporting structure mounted at the rear of the main frame, a transverse conveyer mounted on said structure and positioned to receive material from the upwardly extending conveyer, a longitudinally and forwardly extending conveyer mounted alongside the first named conveyer, and means for angling the lower end of the third named conveyer to slant downwardly from the location on which the transverse conveyer delivers.

17. In a potato digger having a wheel supported main frame, a digger unit mounted on said frame, an upwardly extending conveyer positioned to receive material from said digger unit, and in combination therewith, a supporting structure pivotally mounted at the rear of the main frame, manually operable means for tilting said frame structure, a transverse conveyer mounted on said structure and positioned to receive material from the upwardly extending conveyer, and a longitudinally and forwardly extending conveyer mounted alongside the first named conveyer, the rear end of said forwardly extending conveyer being supported on the pivoted frame structure whereby that end of the conveyer is raised and lowered when the transverse conveyer is tilted about its pivot axis on the frame structure.

18. In a potato digger having a wheel supported main frame, a digger unit mounted on said frame, an upwardly extending conveyer positioned to receive material from said digger unit, and in combination therewith, a supporting structure pivotally mounted at the rear of the main frame, a transverse conveyer mounted on said structure and positioned to receive material from the upwardly extending conveyer, a longitudinally and forwardly extending conveyer mounted alongside the first named conveyer and positioned to receive material from the transverse conveyer, the rear end of said forwardly extending conveyer being supported on the pivoted frame structure whereby that end of the conveyer is raised and lowered when the transverse conveyer is tilted about its pivot axis on the frame structure, and means for angling the lower end of the third named conveyer to slant downwardly from the location on which the transverse conveyer delivers, the third named conveyer being formed of elements having raised portions intermediate their ends whereby a separation is obtained between the stones and the potatoes which roll over the raised portions.

19. A potato digger comprising a wheel supported main frame, a digger unit adjustably mounted on a transverse axis on said frame, said unit including a digging plow and a rearwardly and upwardly extending shaker conveyer, a supporting frame structure at the rear of the main frame adjustably pivoted on a transverse axis, a cross-conveyer mounted on said frame to receive potatoes and other material discharged over the end of the shaker conveyer, a separating and elevating conveyer longitudinally mounted with its forward end supported on the main frame and its rear end supported on the rear supporting frame structure, the rear end of said conveyer being below the cross-conveyer and in a position to receive material discharged therefrom, and means for dropping the side of the rear support at the outside of the conveyer relative to the inside whereby the lower end of the conveyer is angled downwardly away from the discharge end of the cross-conveyer.

20. A potato digger comprising a wheel supported main frame, a digger unit adjustably mounted on a transverse axis on said frame, said unit including a digging plow and a rearwardly and upwardly extending shaker conveyer, a supporting frame structure at the rear of the main frame adjustably pivoted on a transverse axis, a cross-conveyer mounted on said frame to receive potatoes and other material discharged over the end of the shaker conveyer, a separating and elevating conveyer longitudinally mounted with its forward end supported on the main frame and its rear end supported on the rear supporting frame structure, the rear end of said conveyer being below the cross-conveyer and in a position to receive material discharged therefrom, and means for dropping the side of the rear support at the outside of the conveyer relative to the inside whereby the lower end of the conveyer is angled downwardly away from the discharge end of the cross-conveyer, said elevating and separating conveyer being formed of a plurality of elements having raised portions intermediate their ends whereby a separation is brought about between flat stones and potatoes, the stones being retained at the inner side of the conveyer and the potatoes rolling over the raised portions to the outer side thereof.

21. In a potato digger, a wheel supported main frame, a digging unit mounted on said frame, a shaking conveyor mounted on the main frame, a stone and potato separating conveyor mounted on the main frame, means for delivering material from the shaking conveyor to the separating conveyor, power operated means for driving said conveyors, and a change speed transmission interposed in said means between the source of power and the shaking conveyor whereby the shaking conveyor may be driven at a rate of speed variable with respect to the rate of speed of the separating conveyor, said power operated means including means whereby said separating conveyor may be driven at a uniform speed though said shaking conveyor is driven at a variable speed.

22. In a potato digger, a wheel supported main frame, a digging unit mounted on said frame, a shaking conveyor mounted on the main frame, a stone and potato separating conveyor mounted on the main frame, means for delivering material from the shaking conveyor to the separating conveyor, power operated means for driving said conveyors, and a reversing means interposed in said power operated means between the source of power and the shaking conveyor whereby said shaking conveyor may be reversed to release stones and trash overloading said shaking conveyor, said power operated means including means whereby said separating conveyor may be driven at a uniform speed in the same forwardly direction though said shaking conveyor is being reversed.

23. In a potato digger, a wheel supported main frame, a digging unit mounted on said frame, a shaking conveyor mounted on the main frame, a separating conveyor, means for delivering material from the shaking conveyor to the separating conveyor, power operated means for driving said conveyors, and a change speed transmission interposed in said means between the source of power and the shaking conveyor, said change speed transmission including a reversing means whereby said shaking conveyor may be reversed to release stones and trash overloading said shaking conveyor, said power operated means including means whereby said separating conveyor may be driven at a uniform speed in the same forwardly direction though said shaking conveyor is being reversed.

24. In a potato harvesting machine as set forth in claim 8, said separating conveyor comprising a plurality of slats, said slats having uniformly curved upturned ends whereby potatoes are prevented from being bruised and an approximately central uniformly upturned ridge whereby the potatoes are separated from the rocks.

25. In a potato harvesting machine as set forth in claim 8, said separating conveyor comprising a plurality of slats, said slats having uniformly curved upturned ends and an approximately central uniformly upturned ridge, a plurality of chains for driving said conveyor and means for attaching said slats to said chains, and additional raised slats interspaced between a plurality of said first mentioned slats and connected to said chains forming compartments whereby the rocks and potatoes are separated and prevented from rolling down the conveyor.

26. The combination with a tractor, of a potato digger having a wheel supported frame, means for attaching said digger to the tractor, a digging unit mounted on said frame, said digging unit comprising an upper and lower section, said upper section rigidly attached to said wheel supported frame, a transverse support forwardly mounted on said wheeled frame, means for connecting said lower section to said transverse support, means for attaching said lower section to said upper section, and means for raising and lowering said lower section.

27. A tractor operated potato digger attachment comprising a wheel supported frame, means for attaching said attachment to a tractor, a digging unit mounted on said frame, said digging unit comprising an upper and lower section, said upper section rigidly attached to said wheel supported frame, a transverse support forwardly mounted on said wheeled frame, means for connecting said lower section to said transverse support, means for attaching said lower section to said upper section, and means for raising and lowering said lower section.

28. In combination with a tractor, a potato digger having a two wheeled frame, means for attaching said frame to the tractor, a digging unit mounted on said frame, said digging unit comprising an upper and lower section, said upper section rigidly attached to said wheel supported frame, a transverse support forwardly mounted on said wheeled frame, means for connecting said lower section to said transverse support, means for attaching said lower section to said upper section, and means for raising and lowering said lower section.

29. In combination with a tractor, a potato digger having a two wheeled frame, means for attaching said digger to the tractor, a digging unit mounted on said frame, said digging unit comprising an upper and lower section, said upper section rigidly attached to said wheel supported frame, a transverse support forwardly mounted on said wheeled frame, means for connecting said lower section to said transverse support, means for attaching said lower section to said upper section, said means comprising a support mounted on the lower end of said upper section and a support mounted on the upper end of said lower section whereby said lower section may be permitted to pivot and move longitudinally when said lower section is raised and lowered, and means for raising and lowering said lower section.

30. In combination with a tractor having a power take-off; a potato digger having a two wheeled frame; means for attaching said digger to the tractor; a digging unit mounted on said frame; said digging unit comprising an upper and lower section, said upper section rigidly attached to said wheel supported frame; a transverse support forwardly mounted on said wheeled frame; means for connecting said lower section to said transverse support; means for attaching said lower section to said upper section; a shaking conveyor rotatably mounted on said digging unit; means on the upper section for supporting and driving said shaking conveyor; means on the lower end of said lower section for rotatably supporting said conveyor; means on the frame structure for driving said conveyor; said means including in combination an extensible shaft connecting the power take-off, a transmission means in series permitting the conveyor to be run at variable speeds, upwardly, reversed, or stopped in neutral, a gear-box, means for connecting said gear box to the transmission, means for driving said conveyor from said gear box; a digging blade mounted on said aforementioned lower unit, and means for raising and lowering said lower section.

31. In a potato harvesting machine as set forth in claim 30, conveying means mounted on the rear end of the upper section of said digger unit, means for driving said conveying means, said conveying means comprising a transverse conveying means for conveying stones and potatoes laterally, a longitudinal conveyor receiving vines and potatoes and rocks from said digging unit and discharging the vines at the rear while permitting the stones and rocks to fall on said transverse conveying means, and adjustable tilting means for tilting said first mentioned conveying means whereby the potatoes travel to the rear side of said transverse conveying means for a partial separation, and a separating conveyor with an upturned ridge along its center parallel to said digging unit for mechanically separating the rocks and potatoes received from said transverse conveying means.

32. The combination with a tractor having a power take-off, of a potato harvester comprising a two wheeled frame, means for attaching said frame to the tractor, a digging unit mounted on said frame, an upwardly driven shaking conveyor mounted on said digging unit, a transverse support forwardly mounted on said two wheeled frame, means for attaching said digging unit to said transverse support, a digging blade attached to said digging unit, adjustable means for raising and lowering said digging blade, conveying means receiving the discharge from said digging unit; said conveying means comprising a rearwardly extending conveyor discharging vines and weeds to the rear though permitting stones and potatoes to fall therethrough and a transverse discharging means receiving the potatoes and stones; a lateral, forwardly and upwardly extending sorting conveyor mounted on said aforementioned wheeled frame, hoppers mounted on the forward end of said sorting conveyors, an operator's platform mounted on said wheeled frame adjacent said sorting conveyor, power driven means mounted on said potato harvester for driving said aforementioned conveyors, and means connecting said power driven means to the aforementioned power take-off.

WILLIAM C. DWYER.
LEWIS E. SMITH.